United States Patent
Hargreaves et al.

(10) Patent No.: US 9,299,083 B2
(45) Date of Patent: Mar. 29, 2016

(54) ELECTRONIC DATA GENERATION METHODS

(75) Inventors: Michael John Hargreaves, Sunbury (AU); Michele Levine, Melbourne (AU); Jonathan Zio Mor, Cheltenham (AU); Duc Anh Ngo, Sunshine (AU); Tristan Aaron Reeves, Footscray (AU); Grant Leslie Rhys-Jones, Macleod (AU); Marcus Adrian Tarrant, Middle Park (AU); Michael Ernst Wildenauer, Mount Macedon (AU)

(73) Assignee: ROY MORGAN RESEARCH PTY LTD, Melbourne (AU)

( * ) Notice: Subject to any disclaimer, the term of this patent is extended or adjusted under 35 U.S.C. 154(b) by 77 days.

(21) Appl. No.: 13/524,118

(22) Filed: Jun. 15, 2012

(65) Prior Publication Data

US 2013/0018899 A1    Jan. 17, 2013

(51) Int. Cl.
*G06F 7/00* (2006.01)
*G06F 17/30* (2006.01)
*G06Q 30/02* (2012.01)

(52) U.S. Cl.
CPC .................................. *G06Q 30/0201* (2013.01)

(58) Field of Classification Search
None
See application file for complete search history.

(56) References Cited

U.S. PATENT DOCUMENTS

| | | | |
|---|---|---|---|
| 5,227,874 A * | 7/1993 | Von Kohorn | 705/7.32 |
| 7,680,824 B2 * | 3/2010 | Plastina et al. | 707/737 |
| 8,086,166 B2 * | 12/2011 | Scheuring | 434/353 |
| 8,285,726 B2 * | 10/2012 | Billmaier et al. | 707/748 |
| 2003/0050994 A1 * | 3/2003 | Pollack | 709/217 |
| 2006/0136960 A1 * | 6/2006 | Morris | 725/13 |
| 2009/0094286 A1 * | 4/2009 | Lee | G06Q 30/02 |
| 2010/0004977 A1 * | 1/2010 | Marci et al. | 705/10 |
| 2011/0029544 A1 * | 2/2011 | Hsu et al. | 707/749 |
| 2011/0087682 A1 * | 4/2011 | Serjeantson et al. | 707/754 |
| 2011/0256520 A1 * | 10/2011 | Siefert | G06F 19/36 434/322 |
| 2012/0259240 A1 * | 10/2012 | Llewellynn et al. | 600/558 |

* cited by examiner

*Primary Examiner* — Tuan A Pham
(74) *Attorney, Agent, or Firm* — RatnerPrestia

(57) ABSTRACT

An electronic method for generating group data indicative of the collective response of at least a subset of respondents to at least one portion of a time-varying stimulus the method comprising: receiving responses to the time-varying stimulus from respective ones of a plurality of respondent devices, each response including data indicative of a response of a respondent associated with the respective respondent device to the time-varying stimulus; filtering the responses to generate a filtered response data set that excludes responses outside of a timing tolerance relative to a portion of the time-varying stimulus to which the group data is intended to relate; and processing at least a subset of the filtered response data set to generate the group data.

16 Claims, 10 Drawing Sheets

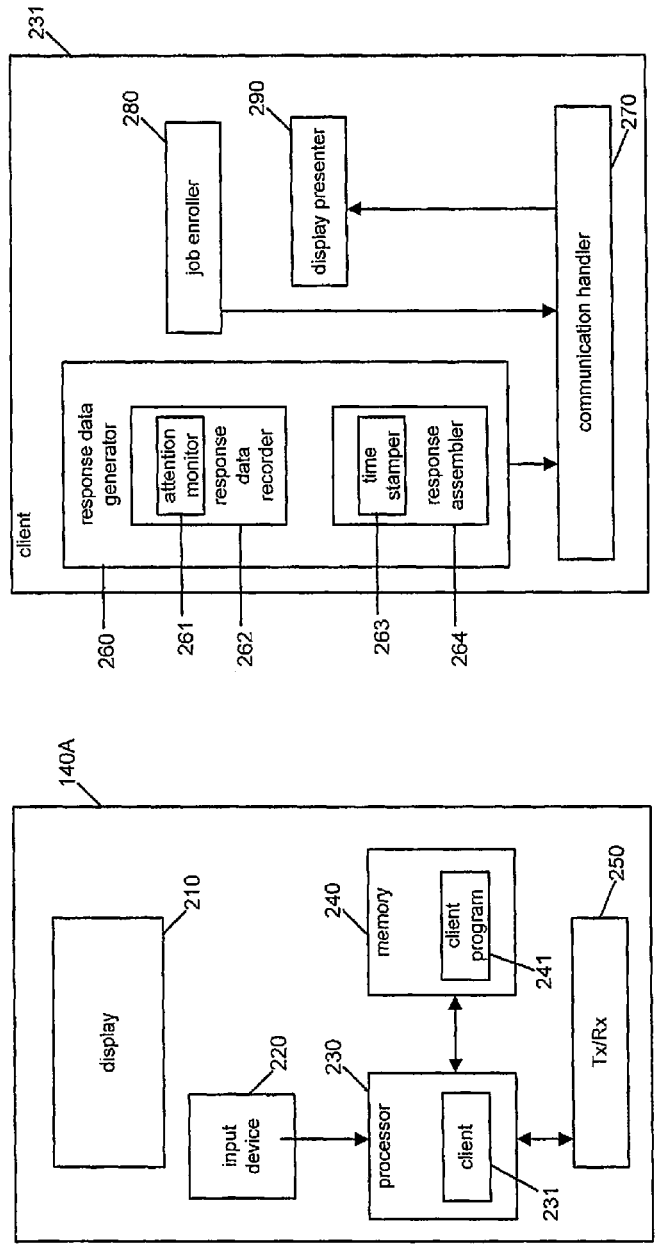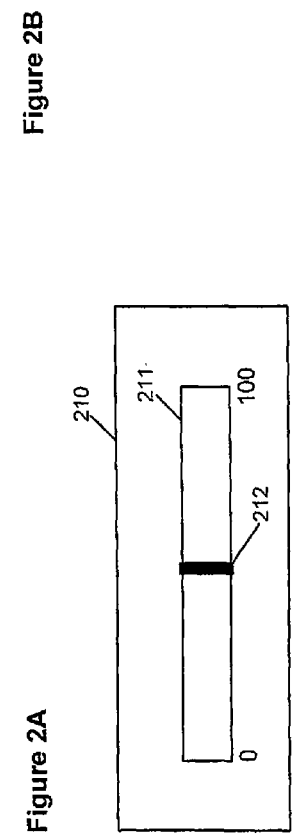

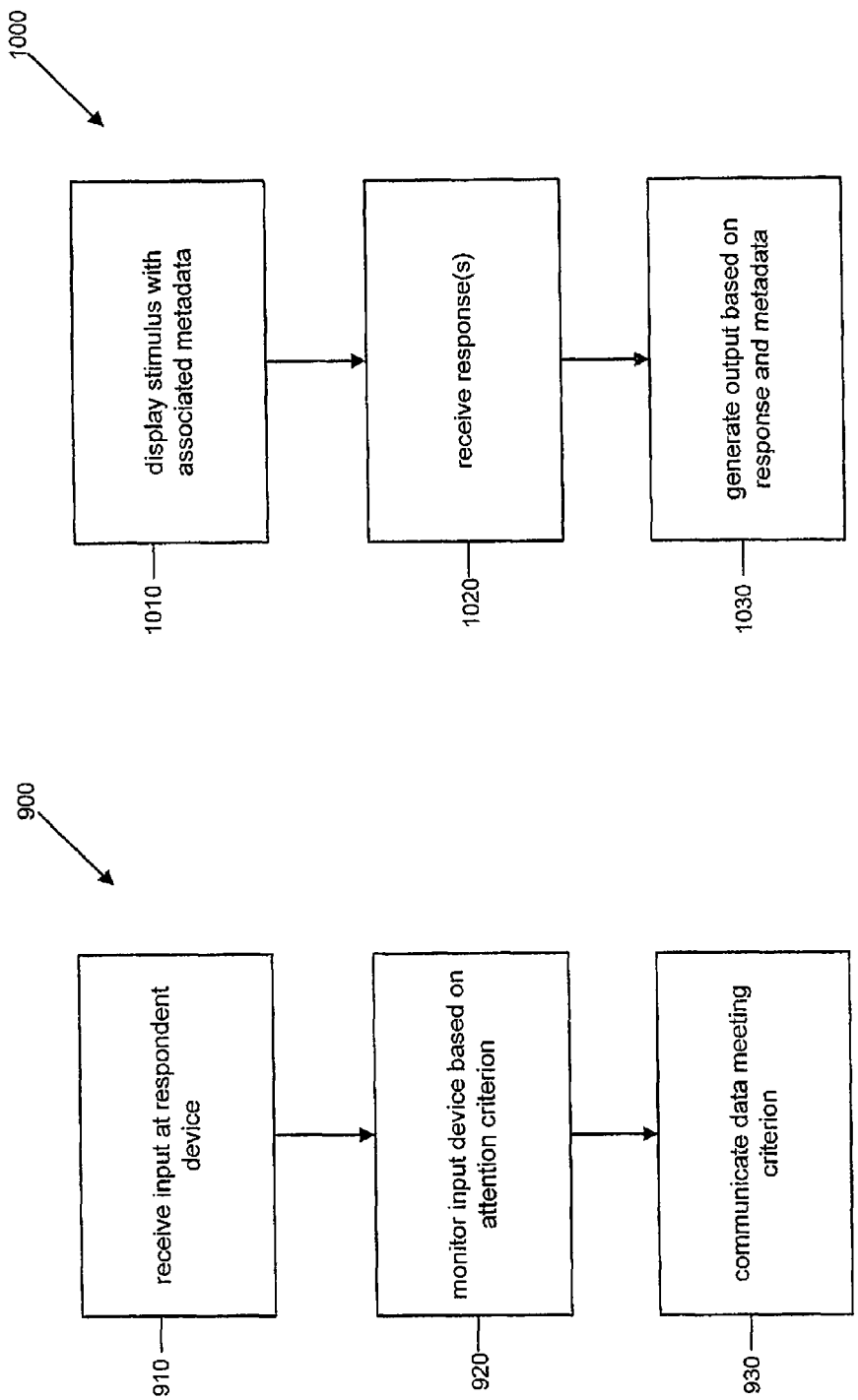

ELECTRONIC DATA GENERATION METHODS

RELATED APPLICATION

This application is based on and claims the benefit of the filing and priority dates of AU application no. 2011902840 filed 15 Jul. 2011, the content of which as filed is incorporated herein by reference in its entirety.

FIELD

The invention relates to electronic data generation methods, an output data generation system, a respondent device, and an electronic method of controlling communication of response data.

BACKGROUND

A number of techniques have been used to determine the opinion of respondents to a stimulus at a point in time. Often these techniques involve asking particular qualitative or quantitative questions and then logging and consolidating the individual responses. The responses to these questions are generally "static". Dynamically measuring response to a dynamic stimulus such as a live debate, a video, or audio has typically been undertaken by asking questions at a point in time. Once data is gathered, it is usually processed to generate output data. The output data may be displayed visually.

There is a need for alternative techniques for use generating output data that captures the responses of respondents.

SUMMARY

In a first aspect, the invention provides an electronic method for generating group data indicative of the collective response of at least a subset of respondents to at least one portion of a time-varying stimulus the method comprising:
  receiving responses to the time-varying stimulus from respective ones of a plurality of respondent devices, each response including data indicative of a response of a respondent associated with the respective respondent device to the time-varying stimulus;
  filtering the response data to generate a filtered response data set that excludes responses outside of a timing tolerance relative to a portion of the time-varying stimulus to which the group data is intended to relate; and
  processing at least a subset of the filtered response data set to generate the group data.

In an embodiment, the method comprises outputting the group data to a display generation system arranged to process the group data to generate a display of group data.

In an embodiment, the method comprises processing the at least a subset of the filtered response data set to generate a display of the group data.

In an embodiment, the collective response of respondents is to be displayed over a period of time such that respondents provide responses related to plural portions of the time-varying stimulus, and the method comprises repeatedly filtering the responses to generate plural filtered response data sets within a timing tolerance of respective ones of plural portions of the time-varying stimulus such that each response data set is comprised of responses within the timing tolerance whereby a first response from at least one specific respondent device is included in at least one filtered response data set and a second response from the at least one specific respondent device is excluded from at least one filtered data set.

In an embodiment, the response data includes time data indicative of a time at which the response data was generated and the time data is checked when filtering the response data to determine whether communication of the response data involved a delay greater than the timing tolerance.

In an embodiment, the method comprises receiving an external computing system identifier of one of the respondents, and identifying one or more of the other respondents based on the external computing system identifier of the respondent.

In an embodiment, identifying the other respondents comprises retrieving data enabling an identification of respondents from an external computing system using the external computing system identifier of the respondent.

In an embodiment, the method comprises:
  filtering the responses to generate a respondent response data set that excludes responses not received from the identified other respondents;
  generating message data based on the respondent response data set; and
  transmitting the message data to the external computing system using the external computing system identifier of the respondent.

In an embodiment, the message data comprises one or more metrics, scores, or metrics and scores.

In an embodiment, the external computing system provides a social networking website.

In a second aspect, the invention provides an output data generation system for generating group data indicative of the collective response of at least a subset of respondents to at least one portion of a time-varying stimulus, the system comprising:
  a communication interface arranged to receive responses to the time-varying stimulus from respective ones of a plurality of respondent devices, each response including data indicative of a response of a respondent associated with the respective respondent device to the time-varying stimulus;
  a data processor arranged to filter the response data to generate a filtered response data set that excludes responses outside of a timing tolerance relative to a portion of the time-varying stimulus to which the group data is intended to relate and process at least a subset of the filtered response data set to generate the group data.

Thus, some embodiments of the invention enable responses with excessive communication lag to be excluded from the displayed collective response.

In an embodiment, the communication interface is arranged to output the group data to a display generation system arranged to process the group data to generate a display of group data.

In an embodiment, the data processor is arranged to process the at least a subset of the filtered response data set to generate a display of the group data.

In an embodiment, the collective response of respondents is to be displayed over a period of time such that respondents provide responses related to plural portions of the time-varying stimulus; and
  the data processor is arranged to repeatedly filter the responses to generate plural filtered response data sets within a timing tolerance of respective ones of plural portions of the time-varying stimulus such that each response data set is comprised of responses within the timing tolerance, whereby a first response from at least one specific respondent device is included in at least one filtered response data set and a second response from the at least one specific respondent device is excluded from at least one filtered data set.

In an embodiment, the response data includes time data indicative of a time at which the response data was generated and the time data is checked when filtering the response data to determine whether communication of the response data involved a delay greater than the timing tolerance.

In an embodiment, the communication interface is arranged to receive an external computing system identifier of one of the respondents, and the data processor is arranged to identify one or more of the other respondents based on the external computing system identifier of the respondent.

In an embodiment, the data processor identifies the other respondents by controlling the communication interface to retrieve data enabling an identification of respondents from an external computing system using the external computing system identifier of the respondent.

In an embodiment, the data processor is arranged to:
filter the responses to generate a respondent response data set that excludes responses not received from the identified other respondents;
generate message data based on the respondent response data set; and
control the communication interface to transmit the message data to the external computing system using the external computing system identifier of the respondent.

In an embodiment, the message data comprises one or more metrics, scores, or metrics and scores.

In an embodiment, the external computing system provides a social networking website.

In a third aspect, the invention provides an electronic method of controlling response data communicated to a data processing system from a respondent device, the method comprising:
receiving, via an input device of a respondent device, input indicative of the respondent's responses to at least one portion of a time-varying stimulus;
monitoring the input device to identify any portions of the input that meet an attention criterion; and
communicating response data based on only the portions of the input that meet the attention criterion from the respondent device to a data processing system.

In an embodiment, the input device comprises a touch screen operable to control an input interface displayed on a display associated with the touch screen, and the attention criterion is that the respondent has maintained contact with the touch screen.

In an embodiment, the attention criterion is that the respondent has altered the input within a defined time period.

In an embodiment, the time-varying stimulus comprises a transmission to the respondent.

In an embodiment, the method comprises displaying the transmission on the respondent device.

In an embodiment, the method comprises:
receiving an external computing system identifier of the respondent; and
upon receiving an input indicative of a response of the respondent,
generating message data; and
communicating the message data to an external computing system using the external computing system identifier of the respondent.

In an embodiment, the message data includes information indicative of or related to the time-varying stimulus.

In an embodiment, the information is a description of the time-varying stimulus.

In an embodiment, the external computing system provides a social networking website.

In a fourth aspect, the invention provides a respondent device for controlling response data communicated to a data processing system, the respondent device comprising:
an input device operable by a respondent to input responses to at least one portion of a time-varying stimulus;
an input monitor arranged to monitor the input device to identify any portions of the input that meet an attention criterion; and
a communication module arranged to communicate response data based on only the portions of the input that meet the attention criterion from the respondent device to a data processing system.

In an embodiment, the input device comprises a touch screen operable to control an input interface displayed on a display associated with the touch screen, and the attention criterion is that the respondent has maintained contact with the touch screen.

In an embodiment, the attention criterion is that the respondent has altered the input within a defined time period.

In an embodiment, the time-varying stimulus comprises a transmission to the respondent.

In an embodiment, the device comprises a display arranged to display the transmission.

In an embodiment, the input device is operable by the respondent to input an external computing system identifier of the respondent, and the device is arranged to, upon an input indicative of a response of the respondent being input, generate message data and communicate the message data to an external computing system using the external computing system identifier of the respondent.

In an embodiment, the message data includes information indicative of or related to the time-varying stimulus.

In an embodiment, the information is a description of the time-varying stimulus.

In an embodiment, the external computing system provides a social networking website.

In a fifth aspect, the invention provides an output data generation system comprising:
a data processing system; and
a plurality of respondent devices, each respondent device comprising:
an input device operable by a respondent to input responses to at least one portion of a time-varying stimulus;
an input monitor arranged to monitor the input device to identify any portions of the input that meet an attention criterion; and
a communication module arranged to only communicate response data based on only the portions of the input that meet the attention criterion from the respondent device to the data processing system,
the data processing system arranged to process the communicated response data from at least a subset of the plurality of respondent devices to generate group output data indicative of a collective response to the time-varying stimulus.

In an embodiment, the input device of each respondent device comprises a touch screen operable to control an input interface displayed on a display associated with the touch screen, and the attention criterion is that the respondent has maintained contact with the touch screen.

In an embodiment, the attention criterion with respect to each respondent device is that the respondent has altered the input within a defined time period.

In an embodiment, the time-varying stimulus comprises a transmission to the respondent.

In an embodiment, each respondent device comprises a display arranged to display the transmission.

In an embodiment, the input monitor of each respondent device is operable by a respective respondent to input an external computing system identifier of the respondent, and each respondent device is arranged to, upon an input indicative of a response of a respective respondent being input, generate message data and communicate the message data to an external computing system using the external computing system identifier of the respondent.

In an embodiment, the message data includes information indicative of or related to the time-varying stimulus.

In an embodiment, the information is a description of the time-varying stimulus.

In an embodiment, the external computing system provides a social networking website.

In a sixth aspect, the invention provides computer program code which when executed is arranged to:
- enable a respondent to input responses to at least one portion of a time-varying stimulus;
- monitor input indicative of the respondent's responses to identify any portions of the input that meet an attention criterion; and
- communicate response data based on only the portions of the input that meet the attention criterion to a data processing system.

In an embodiment, the respondent's responses are input using a touch screen, and the attention criterion is that the respondent has maintained contact with the touch screen.

In an embodiment, the attention criterion is that the respondent has altered the input within a defined time period.

In an embodiment, the time-varying stimulus comprises a transmission to the respondent.

In an embodiment, the computer program code when executed is arranged to control a display to display the transmission.

In an embodiment, the computer program code when executed is arranged to:
- receive an external computing system identifier of the respondent; and
- upon receiving an input indicative of a response of the respondent,
  - generate message data; and
  - communicate the message data to an external computing system using the external computing system identifier of the respondent.

In an embodiment, the message data includes information indicative of or related to the time-varying stimulus.

In an embodiment, the information is a description of the time-varying stimulus.

In an embodiment, the external computing system provides a social networking website.

In a seventh aspect, the invention provides an electronic method for generating data for display based on a time-varying stimulus stored in a memory in association with descriptive metadata corresponding to at least one part of the time-varying stimulus, the method comprising
- outputting the time-varying stimulus to one or more respondents;
- receiving response data of the one or more respondents to the time-varying stimulus; and
- generating a time series of output data for display based on the received response data and the descriptive metadata.

In an embodiment, there are at least two different items of descriptive metadata corresponding to different parts of the time-varying stimulus, and the method comprises generating different outputs in dependence on the different items of descriptive metadata.

In an embodiment, the method comprises generating the time series of output data automatically upon determining that sufficient response data has been received.

In an embodiment, the method comprises generating the time series of output data automatically upon conclusion of output of the time-varying stimulus to a plurality of respondents.

In an embodiment, the method comprises processing the response data of at least a subset of respondents in conjunction with respondent profile data of the respondents to generate at least one metric that complements the time series of output data.

In an embodiment, the method comprises receiving an external computing system identifier of one of the respondents, and identifying one or more of the other respondents based on the external computing system identifier of the respondent.

In an embodiment, identifying the other respondents comprises retrieving data enabling an identification of respondents from an external computing system using the external computing system identifier of the respondent.

In an embodiment, the method comprises:
- filtering the time series of output data to generate a respondent time series of output data set that excludes responses not received from the identified other respondents;
- generating message data based on the time series of output data set; and
- transmitting the message data to the external computing system using the external computing system identifier of the respondent.

In an embodiment, the external computing system provides a social networking website.

In an eighth aspect, the invention provides an output data generation system comprising:
- a memory storing time-varying stimulus data in association with descriptive metadata corresponding to at least one part of the time-varying stimulus, the output data generation system arranged to:
  - control output of the time-varying stimulus to one or more respondents;
  - receive response data of the one or more respondents to the time-varying stimulus; and
  - generate a time series of output data for display based on the received response data and the metadata.

In an embodiment, there are at least two different items of descriptive metadata corresponding to different parts of the time-varying stimulus, and the system is arranged to generate different outputs in dependence on the different items of descriptive metadata.

In an embodiment, system is further arranged to generate the time series of output data automatically upon determining that sufficient response data has been received.

In an embodiment, system is further arranged to generate the time series of output data automatically upon conclusion of output of the time-varying stimulus to a plurality of respondents.

In an embodiment, system is further arranged to process the response data of at least a subset of respondents in conjunction with respondent profile data of the respondents to generate at least one metric that complements the time series of output data.

In an embodiment, system is further arranged to receive an external computing system identifier of one of the respondents, and identify one or more of the other respondents based on the external computing system identifier of the respondent.

In an embodiment, system is further arranged to identify the other respondents by retrieving data enabling an identification of respondents from an external computing system using the external computing system identifier of the respondent.

In an embodiment, system is further arranged to:
filter the time series of output data to generate a respondent time series of output data set that excludes responses not received from the identified other respondents;
generate message data based on the respondent time series of output data set; and
control the communication interface to transmit the message data to the external computing system using the external computing system identifier of the respondent.

In an embodiment, the external computing system provides a social networking website.

In a ninth aspect, the invention provides an electronic method for generating group output data for display, the method comprising:
obtaining, for each of a plurality of respondents, a time series of response data corresponding to the same time-varying stimulus;
receiving a user selection of one or more respondent characteristics of a plurality of respondent characteristics stored in association with one or more respondents in respective respondent profiles stored in a respondent database;
identifying which of the plurality of respondents match the selected one or more respondent characteristics by querying the respondent database; and
generating a time series of group output data by combining the respective time series of response data of the identified respondents.

In an embodiment, the method comprises receiving an external computing system identifier of one of the respondents, and identifying one or more of the other respondents based on the external computing system identifier of the respondent.

In an embodiment, identifying the other respondents comprises retrieving data enabling an identification of respondents from an external computing system using the external computing system identifier of the respondent.

In an embodiment, the method comprises:
filtering the time series of group output data to generate a respondent time series of group output data set that excludes responses not received from the identified other respondents;
generating message data based on the respondent time series of group output data set; and
transmitting the message data to the external computing system using the external computing system identifier of the respondent.

In an embodiment, the external computing system provides a social networking website.

In a tenth aspect, the invention provides an output data generation system, the system arranged to:
obtain, for each of a plurality of respondents, a time series of response data corresponding to the same time-varying stimulus;
receive a user selection of one or more respondent characteristics of a plurality of respondent characteristics stored in association with one or more respondents in respective respondent profiles stored in a respondent database;
identify which of the plurality of respondents match the selected one or more respondent characteristics by querying the respondent database; and
generate a time series of group output data by combining the respective time series of response data of the identified respondents.

In an embodiment, system is further arranged to receive an external computing system identifier of one of the respondents, and identify one or more of the other respondents based on the external computing system identifier of the respondent.

In an embodiment, system is further arranged to identify the other respondents by retrieving data enabling an identification of respondents from an external computing system using the external computing system identifier of the respondent.

In an embodiment, system is further arranged to:
filter the time series of group output data to generate a respondent time series of group output data set that excludes responses not received from the identified other respondents;
generate message data based on the respondent time series of group output data set; and
control the communication interface to transmit the message data to the external computing system using the external computing system identifier of the respondent.

In an embodiment, the external computing system provides a social networking website.

In an eleventh aspect, the invention provides an electronic method for generating stimulus comparison data, the method comprising:
receiving a user selection of one or more stimulus characteristics of a plurality of stimulus characteristics stored in a database in association with sets of response data of groups of respondents to respective ones of a plurality of time-varying stimuli;
identifying which of the sets of response data match the selected one or more stimulus characteristics by querying the database; and
processing at least part of the response data to generate stimulus comparison data indicative of a normal response of at least a subset of respondents to the time-varying stimuli to which the identified sets of response data belong.

In an embodiment, the method comprises generating a time series of stimulus comparison data indicative of a time-varying normal response.

In an embodiment, the method comprises:
obtaining output data for a current time-varying stimulus; and
comparing the obtained output data with the stimulus comparison data.

In an embodiment, the method comprises receiving an external computing system identifier of one of the respondents, and identifying one or more of the other respondents based on the external computing system identifier of the respondent.

In an embodiment, identifying the other respondents comprises retrieving data enabling an identification of respondents from an external computing system using the external computing system identifier of the respondent.

In an embodiment, the method comprises:
  filtering the stimulus comparison data to generate a respondent stimulus comparison data set that excludes responses not received from the identified other respondents;
  generating message data based on the respondent stimulus comparison data set; and
  transmitting the message data to the external computing system using the external computing system identifier of the respondent.

In an embodiment, the external computing system provides a social networking website.

In a twelfth aspect, the invention provides an output data generation system arranged to:
  receive a user selection of one or more stimulus characteristics of a plurality of stimulus characteristics stored in a database in association with sets of response data of groups of respondents to respective ones of a plurality of time-varying stimuli;
  identify which of the sets of response data match the selected one or more stimulus characteristics by querying the database; and
  process at least part of the response data to generate stimulus comparison data indicative of a normal response of at least a subset of respondents to the time-varying stimuli to which the identified sets of response data belong.

In an embodiment, the system is further arranged to generate a time series of stimulus comparison data indicative of a time-varying normal response.

In an embodiment, the system is further arranged to:
  obtain output data for a current time-varying stimulus; and
  compare the obtained output data with the stimulus comparison data.

In an embodiment, the system is further arranged to receive an external computing system identifier of one of the respondents, and identify one or more of the other respondents based on the external computing system identifier of the respondent.

In an embodiment, the system is further arranged to identify the other respondents by retrieving data enabling an identification of respondents from an external computing system using the external computing system identifier of the respondent.

In an embodiment, the system is further arranged to:
  filter the stimulus comparison data to generate a respondent stimulus comparison data set that excludes responses not received from the identified other respondents;
  generate message data based on the respondent stimulus comparison data set; and
  control the communication interface to transmit the message data to the external computing system using the external computing system identifier of the respondent.

In an embodiment, the external computing system provides a social networking website.

The invention also extends to computer program code which when executed implements one or more of the above methods. The computer program code may be embodied on a tangible computer readable medium.

It should be noted that any of the various features of each of the above aspects of the invention, and of the various features of the embodiments described below, can be combined as suitable and desired.

BRIEF DESCRIPTION OF THE DRAWINGS

Embodiments of the invention will now be described by way of non-limiting example in conjunction with the following drawings, in which:

FIG. 2A is a block diagram showing the components of a mobile client;
FIG. 2B is a functional block diagram showing the functional components of the client of FIG. 2A;
FIG. 2C shows an example of a user interface for responding to a time-varying stimulus;
FIG. 9 is a flowchart of another method of an embodiment;
FIG. 10 is a flowchart of another method of an embodiment.

DETAILED DESCRIPTION

Figure 1:
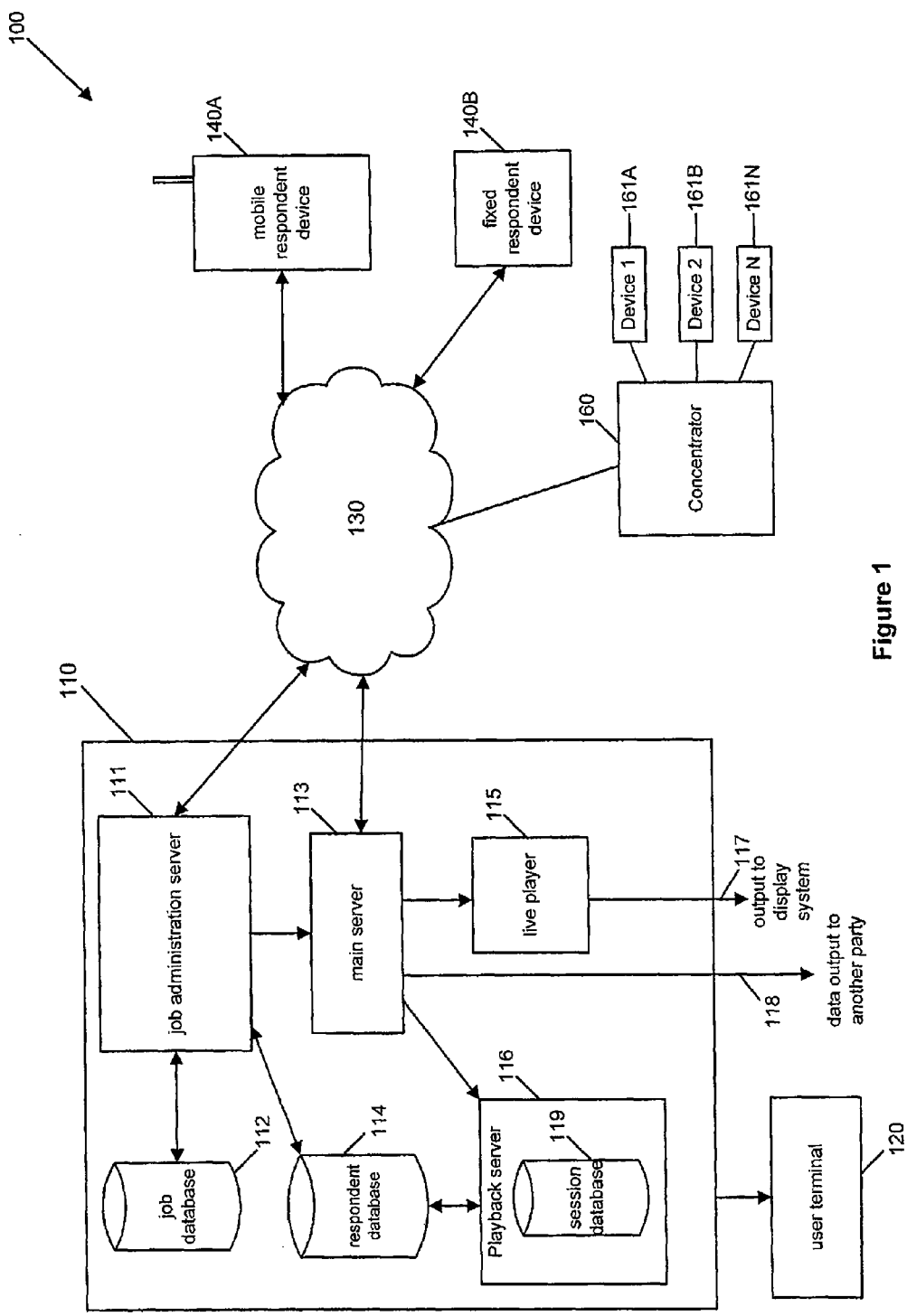
FIG. 1 is a block diagram showing the components of an output generation system.

Referring to the drawings, there are shown embodiments of an output data generation system which can be used in electronic data generation systems for generating output data corresponding to the responses of respondents to time-varying stimuli. Also illustrated are various components of the output data generation system which assist in the generation of data.

Embodiments of the invention find application in the monitoring of an audience of respondents response to a time varying stimulus. The nature of the time-varying stimulus will vary from embodiment to embodiment.

A time-varying stimulus is a stimulus presented to a respondent for response over a period of time such that the stimulus to which the respondent responds changes and hence the respondent's response may change. Examples of time varying stimuluses could include, live events such as a debate, a play or a sporting event, transmissions of such events, transmissions of pre-recorded audio and/or visual programs etc. Depending on the embodiment, transmissions may be broadcast to plural respondents (and indeed to non-respondents at the same time or narrowcast to a specific respondent (while the time of presentation of the stimulus is still controlled on the transmission side). In other embodiments, the time of presentation of the stimulus may be controlled by the respondent.

As indicated above, responses to a time-varying stimulus may be gathered in a number of different ways.

FIG. 1 shows an example of an output data generation system which is intended to be used to generate near real-time response data to a time varying stimulus such as a broadcast event. For example, in order to obtain audience responses to a television program while it is being broadcast in order to generate response data that can be presented in conjunction with the television program. For example, as a graphic overlay on display of the television program. In the embodiment, the program is broadcast using conventional means such that the respondents view the program on a television. However, it will also be appreciated that the program could be broadcast using internet protocol or otherwise streamed to a respondent device while enabling the respondent to respond.

The output generation system 100 comprises a number of server side components 110 which communicate over the Internet 130 with client devices (labelled as respondent devices to indicate that they belong to respondents). In the embodiment, the client side components will typically be provided in the form of a computer program which can be caused to run on the relevant device in order to provide the specific functionality required to record response data and communicate it to the server side components while leveraging off the standard components found in the devices.

FIG. 1 shows a mobile respondent device 140A, which would typically be a smart phone, that is, a mobile telephone device with a sufficiently powerful processor to run third party software. Also shown is a fixed respondent device 140B which would typically be in the form of a computer in data communication with the server side components 110 over a wide area communication network such as the Internet 130. A person skilled in the art will appreciate that the lines between mobile devices and fixed devices can be somewhat blurred and herein, the distinction is made merely to indicate that there are possible different types of respondent devices which can communicate, for example, over cellular data communications networks or fixed line/hybrid fixed line wireless networks. Persons skilled in art will also appreciate that there will be a plurality of respondent devices 140 but that only two are shown for simplicity. In a further embodiment, a plurality of respondent devices 161A-161N are connected to a concentrator 160, that aggregates data from the respective devices for communication over the network.

Respondents are enrolled to be members of an audience or panel in a number of ways in respect of which group output data is to be generated. For example, the respondents may already be in a database owned by the company seeking to measure responses to the broadcast event, may be specifically sourced by direct contact or advertisement, or may self enroll in response to an advertisement or information or other communication of the existence of the possibility to be a respondent. Once a respondent enrolls, they download the client application onto their respondent device 140. In the following description, it is assumed that the respondent has installed an operational client on their respondent device 140.

Also shown in FIG. 1 is a user terminal 120 to indicate schematically that a user may interact with various components of the server side components 110. Persons skilled in the art will appreciate that there may be different terminals with different access rights to different parts of the system and as such that a single user terminal 120 is shown to indicate the ability of users to interact with the system.

One aspect of the system 100 is the ability to schedule the plurality of jobs in the system. This is done by a user configuring details of a job in a job database 112. For example, the job may be to gather responses to a talent show broadcast by a television station. The user may edit the job database 112 to specify the types of respondents who may participate in providing the audience response to the talent show. As this is a broadcast television show, the person editing the job may specify that there are no specific requirements, however, they may be interested in the different breakdowns (segmentations) of the demographics of the audience response for men and women as well as people under and over the age of 40. When the television program is to be broadcast, it is advertised—for example, during the first five minute of the show—that live audience response be gathered and the job is loaded into the job administration server 111. Potential respondents operate their devices to indicate that they wish to participate as part of the audience. The devices 140 contact the job administration server 111 based on a job identifier, for example, entered manually by the respondent. The job administration server 111 assigns an identification for this session to each respondent device 140 which is used in communications between the devices to identify the respondent. The job administration server 111 also administers questions by communicating with the respondent device 140 to obtain information regarding the respondent's gender (i.e. male or female) and age in order to fulfil the requirements of this job for segmentation of the audience into different portions of respondents via an input device.

In other embodiments, the respondent device 140 may communicate a respondent identifier to the job administration server 111 which may look up the respondent's details in a respondent database 114 which have been captured at a previous time. If the job administration server 111 determines that the respondent database 114 includes all the information required to answer the questions, the job administration server 111 may not ask the respondent any questions. Alternatively, the job administration server may ask any questions which are needed to supplement the information in the respondent database 114. A further task of the job administration server 111 is to identify the main server 113 with which the mobile respondent device should communicate while the respondent is responding. In this respect, it will be appreciated that while one main server is shown in FIG. 1, there may be a plurality of main servers arranged in a number of different configurations. For example, one server or a group of servers may be allocating to a particular job. If there are a group of servers, the servers may be arranged in a number of different ways such as in a two tier arrangement; a first tier handling direct communication with the respondent devices and a second tier processing the data from all of the servers in the first tier.

In a typical application, the television show will then indicate to the respondent when they should start responding. Further details of how responses are handled are described below, however, in one embodiment the respondents respond by moving a slider bar 212 relative to a scale 211 displayed on display 210 of the respondent device 140A. The scale may appear, for example, as shown in FIG. 2C.

Accordingly, it will be appreciated that the respondent's response entered via the respondent device can also vary over time while the time-varying stimulus is presented (in the form of a broadcast television show in this example).

The main server 113 is arranged to communicate with the respondent devices to receive communication of each respondent's response to the broadcast transmission and to process these to generated output data. In the embodiments, this output data is further processed to generate group data output indicative a collective response of the audience of respondents (or a subset/segment thereof) to the show for display as part of the broadcast transmission in conjunction with the display of the show. Accordingly, it will be appreciated that the talent show example, whether the audience likes a particular performer or not can be displayed in conjunction with the display of the performer's performance on the talent show as well as how the audience response to the performer changes over time. Such an output can be generated in a number of different ways. In one example, data generated by the main server 113 is provided to a live player 115 which formats the data into an appropriate graphical form in order for it to be output to a display system. For example, in a form that can be overlayed immediately over a television broadcast. Alternatively, or in addition, the main server 113 may send output data 118 to a television station (or an intermediary) such that they generate output graphics in a manner in which they desire and/or select what data to use.

Also, in an alternative embodiment, data comprising or derived from the data generated by the main server 113 may be sent to one or more external computing systems. For example, in an embodiment, the output data generation system 100 may be connected to an external computing system providing a social networking website, and data comprising or derived from the data generated by the main server 113 may be sent to the external computing system. Examples of social networking websites include Facebook (Trade Mark), Twitter (Trade Mark), Linkedin (Trade Mark) etc. In such an embodiment, the output data generation system 100 may include a message data generator which formats the generated data into format that can be posted on the social networking website provided by the external computing system. After the message data formats the generated data into a suitable format, the suitably formatted message data can be communicated from the main server 113 to the external computing device. The message data can be communicated to the external computing device using an external computing system identifier (such as a Facebook username and password) of one of the respondents received from one of the respondent devices. Persons skilled in the art will appreciate that the format of the message data generated by the message data generator may be different depending on which social networking website the message data is to be posted to.

In this respect, additional processing may be carried out on the data generated by the main server 113 based on the external computing system identifier of the respondent before the message data generator generates the message data. For example, the output data generation system 100 may include an external computing system data retriever which retrieves external computing system data from the external computing system using the external computing system identifier of the respondent, and the data generated by the main server 113 may be filtered to exclude certain responses based on the respondent data. For example, the external computing system data may include data enabling an identification of one or more of other respondents (such as a list of the respondent's friends on Facebook), and the data generated by the main server 113 may be filtered to exclude responses that are not from identified respondents. In another example, the external computing system data may include respondent profile data (indicating, for example, that the respondent prefers to receive information displayed in the form of one or more metrics, scores, or metrics and scores), and the data generated by the main server 113 may be processed to generate the message data according to the respondent profile data.

Persons skilled in the art will appreciate that the external computing system may provide a social networking service in a different form, for example, in the form of a mobile application or mobile application software (that is, an "app").

Persons skilled in the art will also appreciate that the message data communicated to the external computing system may be transmitted to one or more of the respondent devices. For example, after the message data is communicated to the external computing system, the message data posted on the social networking website may be transmitted to a respondent device when the respondent device is used to view the social networking website or websites. As indicated above, it will be appreciated that the message data transmitted to one respondent device may be different from the message data transmitted to another respondent device when the external computing device identifiers used by the two respondent devices are different.

In addition, the main server 113 ensures that copies of the respondents' responses are stored for future use. In this respect, two copies of the each respondents set of time series responses to the time bearing stimulus are kept. A first copy as a record against the respondent's file in the respondent database 114 and a second copy as part of a session data set of all responses for the session stored in a session database 119 of a playback server 116. The playback server can be used a later date to retrieve a particular session and play it back. Further, as described in further detail below the playback server can be used to change the segmentation of the responses by querying the respondent database 114 based on respondent characteristics that may have not been part of the initial job specification.

FIG. 2A shows the typical components of a mobile respondent device 140A. As can be seen, the device 140A includes a display 210, at least one input device 220 such as a touch screen or keypad, a processor 230 and at least one transceiver circuit 250. A client program 241 is stored in memory 240 such that when the processor executes the program 241, a client 231 is instantiated on the device.

The client 231 is shown in FIG. 2B. The client 231 includes a communication handler 270 arranged to establish communications with the job administration server 111 and/or the main server 113 as needed. The client also includes a job enroller 280 which is arranged to initially contact the job administration server 111 based, for example, on a show identifier and prompt the user via the display for them to input, responses to any questions that are received from the job administration server 111. The client also includes a display presenter 290 which controls the display 210 to display the interface shown in FIG. 2C in the form of a slider bar 212 over scale 211 such that the user can input a response by moving the slider bar relative to the scale 211. Persons skilled in the art will appreciate that other scales can be used for example, a scale from very negative to very positive.

Persons skilled in the art will appreciate that in other embodiments the display presenter 290 may present additional material such as a portion of the transmission. It is advantageous if the input device 220 can be a touch screen overlaying the display such that the user can operate the slider bar 212 by operating the touch screen with their finger to drag the slider bar left or right.

Persons skilled in the art will appreciate that other input techniques could be used, for example, a slider bar could be moved operating a pointing device such as a mouse or by using keys on a keyboard or keypad. In other embodiments, the user interface may be different. For example, a graphical representation of a dial that a respondent rotates to indicate their response.

The response data generator 260 includes a number of components that are used to improve the quality of captured response data.

In this respect, it will be appreciated that in embodiments where it is intended to produce a time-varying series of response data representing the collective responses of respondents to particular portions of the time-variance stimulus in near to real-time, it is important that the responses that are assembled at the main server be related relevantly in time to the broadcast transmission. To this end, the client takes advantage of the fact that most modern mobile telecommunication devices store the network time of the telecommunication network to which they are connected which is usually highly accurate. Accordingly, as part of a response assembler 264 assembling response data for communication the main server, a time stamp is added to each communication of response data to the main server. In this respect, the response data generated includes a response data recorder 262 which records the current position of the slider bar 212 four times every second. The response assembler 264 is also intended to communicate a current set of response data four times a second. Accordingly, each time the response data recorder records a response, the response assembler obtains a time stamp from time stamper 263 and assembles a packet of response data 264 which it communicates to the main server 113.

Figure 6:
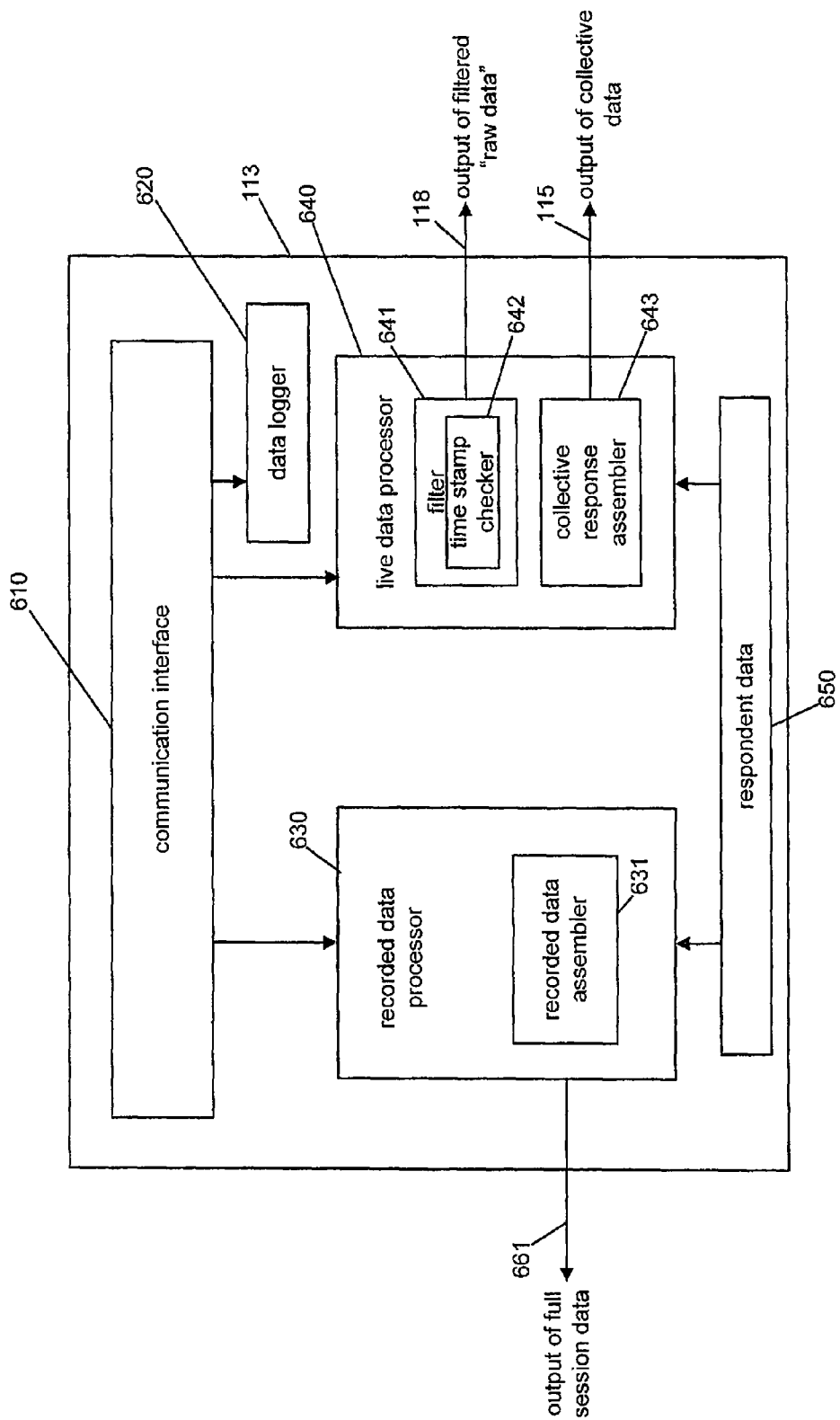
FIG. 6 is a functional block diagram of a main server.

Referring to FIG. 6, the main server 113 comprises a communication interface 610 for communicating with each respondent device 140.

The live data processor 640 is arranged to exclude data which has been affected by transmission lag in each time period. In this respect, it will be appreciated that individual communications from individual respondent devices can take longer than others to reach the main server 113. If all of the responses were processed in the same way, responses received at a particular time could relate to different portions of the program leading to an invalid output. Excessive communication delay from individual devices is advantageously eliminated by the live data processor 640 filtering responses in each time epoch to exclude data outside of a timing tolerance. The timing tolerance can be set based on factors such as the relative location of the server relative to the broadcast or based on measured delivery to ensure that a sufficient number of respondents are captured. Accordingly, the live data processor includes a filter 641 which include a time stamp checker 642 which checks the time stamp in each individual piece of response data received from the respondent devices 140 against local time at the main server 113. In addition, the live data processor 640 includes a collective response assembler 643 which assembles data indicative of a collective response, for example to the average score of each included piece of response data in the time epoch. The collective response assembler 643 also generates collective responses corresponding to each segmentation of the data specified for this job based on respondent data 650. In this example based on gender (male/female) and age group under/over 40. This can be then rendered into a display for display on the graphic as a graphic over the broadcast so that respondents and other viewers of the television program can see how the audience is responding to the television program.

In addition, a recorded data processor 630 records all data for the particular session for saving to the respondent database and the session database as described above. This is obtained by recording the data for each respondent in conjunction with the respondent data 650 previously passed by the job administration server and main server 113. That is, each respondent's response that is provided is processed into a time series of response data items which are associated with respective ones of particular respondent. Individual respondent's data is stored against their respondent records. The responses of all the respondents are stored together as the session data.

A data logger 620 keeps a copy of all communications in case data is lost during processing and it is necessary to re-establish the session.

A further level of filtering the data is implemented at the client 231. In this respect the response data generator 260 includes an attention monitor 261. In the embodiment, the attention monitor 261 monitors the input device in the form of a touch screen to determine whether an attention criterion was met. That is, the attention monitor which monitors the input device so that the response data recorder 262 only records data when a response criteria is met such that responses are then only sent to the main server while a response criterion is being met. In the example of a touch screen, a response criterion may be that the user has maintained contact between their finger and the touch screen and not released the touch screen. An alternative response criterion which may be used in relation to a touch screen or other input devices is that the user has moved the slider bar within a defined period and is hence actively changing the response that they are providing in response to the stimulus rather than absorbing the material passively.

It will be appreciated that this has the advantage of excluding responses of respondents who are not engaged with the stimulus. This is particularly advantageous in embodiments where the response is remotely located such that it is not possible to supervise the respondents to determine whether they are paying attention or not.

Processing other than filtering (as described above) may be implemented at the client 231. For example, the job enroller 280 may include a message data generator arranged to, upon transmission of a job identifier to the job administration server 111, generate message data and control the communication handler to transmit the message data to an external computing system (such as Facebook) using an external computing system identifier of the respondent operating a respondent device. For example, when the respondent device transmits a job identifier to the job administration server 111, a message may be generated and posted on Facebook to alert Facebook friends of the respondent that the respondent is reacting to a particular time-varying stimulus. The message data may include information indicative of, or related to, the time-varying stimulus (for example, a description of the time-varying stimulus). Persons skilled in the art will appreciate that message data may be generated and transmitted from the respondent device to more than one external computing system. For example, separate message data may be generated and transmitted to Facebook and Tweeter.

Also, it is envisaged that message data may be alternatively generated on the server side of the output data generation system 100 and that the message data may be communicated from the server side to the external computing system or systems. For example, the main server 113 may receive external computing systems identifiers of respondents from respective respondent devices before a broadcast transmission, and the message data may be communicated from the main server 113 to the external computing system or systems using the external computing system identifiers. The message data may be generated and transmitted in response to receipt of job identifiers from respondent devices. Alternatively, the message data may be generated and transmitted when the main server 113 receive responses from the respondents.

As indicated above, respondents could also respond to a time varying stimulus in other circumstances. For example, narrowcast transmissions could be made over the internet to respondent devices in the form of computers of a selected group of respondents and those respondents could respond in real-time in a manner analogous to that described above.

Figure 3:
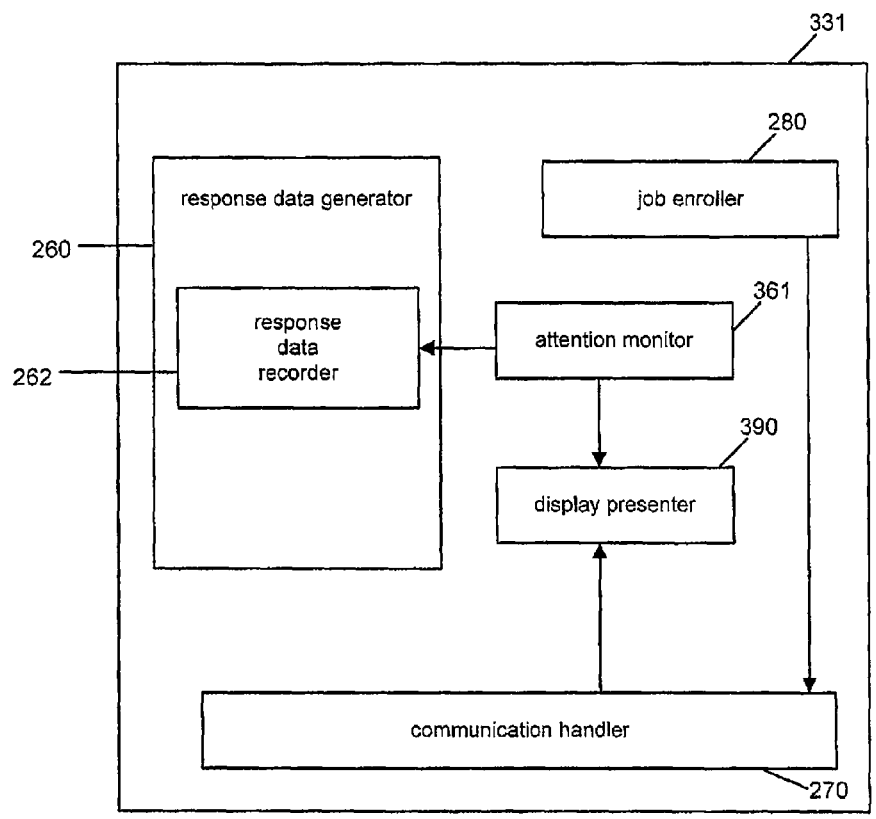
FIG. 3 is a block diagram of an alternative client.

FIG. 3 illustrates an alternative embodiment where respondents are not required to respond in real-time but rather can respond at a time of their choosing. In this case, the respondent device 331 has a different configuration of the attention monitor 361 and display presenter 390. In this embodiment, the attention monitor 361 is arranged to monitor the input device and pause presentation of the time-varying stimulus, if it detects that the user is no longer paying attention. Presentation of the time-varying stimulus will then resume once under control of display presenter 390 once the user is paying attention again such that an entire session of data will be generated by the response data generated once the user has monitored the entire stimulus.

Figure 4:
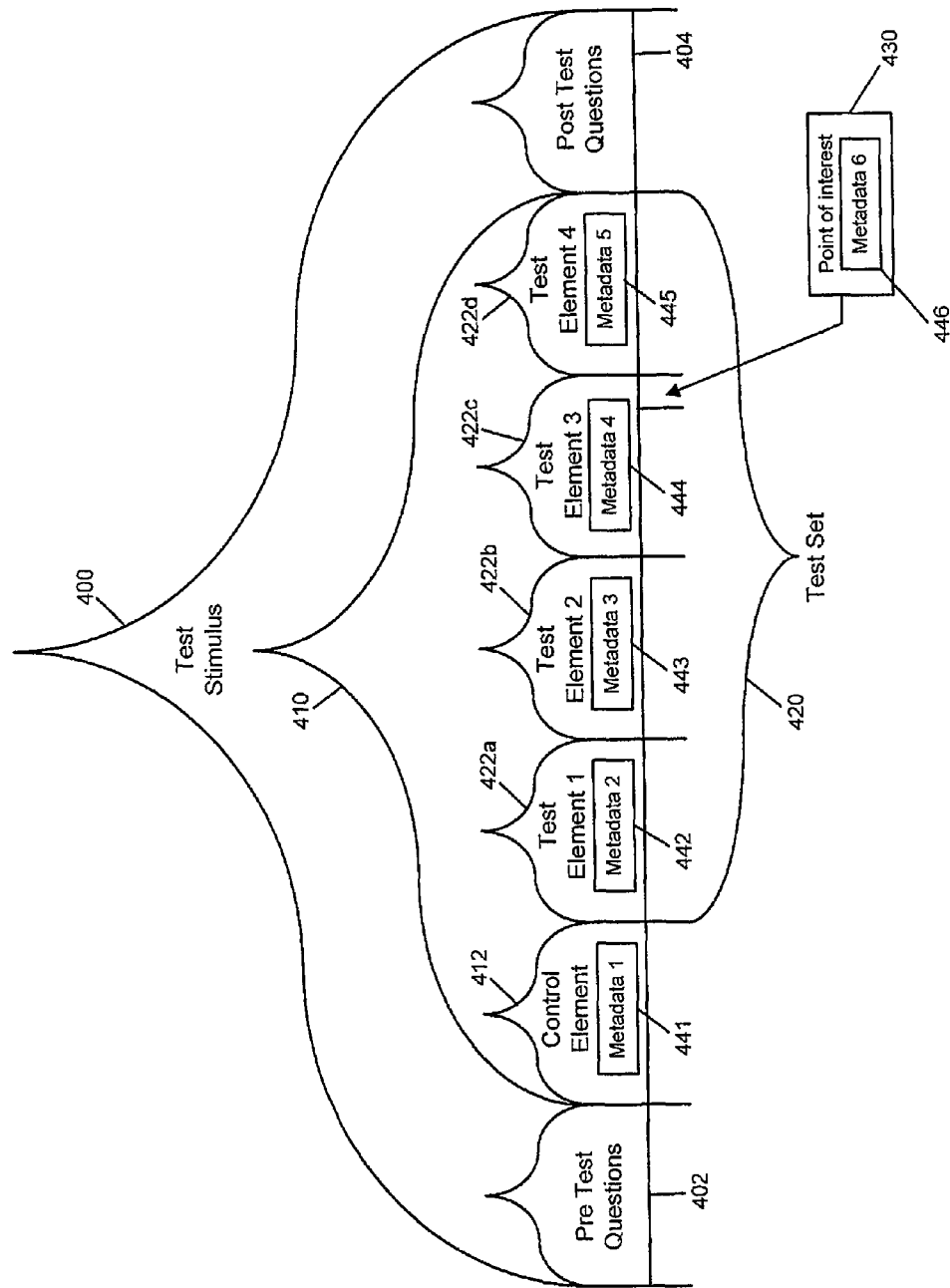
FIG. 4 shows the structure of a session set of an embodiment.

FIG. 4 illustrates the typical components of a session set 400 which comprises a set of data which is presented to the user. The session set 400 includes pre-test questions 402, a control element 412, a number of test elements, in this example four test elements 422a to 422d, and post test questions 404. The test elements are known as the test set. The control element is used to assess how the user responds.

In the embodiment, metadata 441-446 can be incorporated into the control of test elements and/or at a specific point of interest 430 within a specific test element. The metadata can then be used to generate output at specific points, for example, in addition to displaying the collective responses of respondents to the time varying stimulus. In the embodiment, the metadata is used to in a number of ways, including to populate response data (e.g. with information identifying a control element). Another manner in which metadata may be used is to provide different segmentations of the output data depending on the metadata. For example, "Metadata 2" 442 may specify that a male/female segmentation is required such that average responses of male and female respondents are displayed whereas "Metadata 3" 443 may specify that an age group by age group output is required. Further, the metadata may specify when an output is displayed. For example, in addition to the time-varying data, it may be desired to output metrics indicative of other different measures such as likeability, peak scores, sustain likability, critical likability, cut through and end score. "Metadata 6" 446 can cause an output of a specific metric (e.g. likeability) at the point of interest 430. For example, a predefined high point in an advertisement.

Persons skilled in the art will also appreciate use of metadata can, in some embodiments, enable the stimulus to be re-ordered as part of a process of randomising the stimulus presented to different respondents. The responses then can be automatically reassembled into responses to the different segments. This can remove effects caused by the user's attention varying over the entirety of the test set 420.

Figure 7:
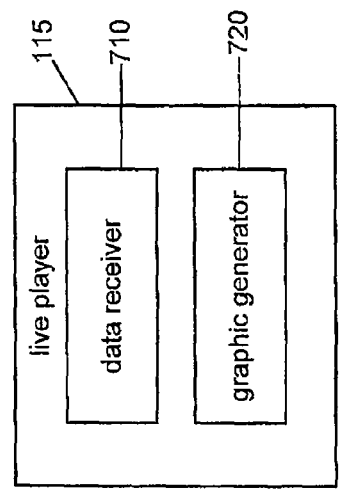
FIG. 7 is a functional block diagram of a live player server.

FIG. 7 shows the live player 115 which is arranged to generate graphic representing a collective time varying response. The live player 115 includes a data receiver 710 and a graphic generator 720. The live player receives the collective response data from the live data processor 640 and formats it into desired graphics. The output then typically has on one axis, a time and on another axis measure of the collective response based on a score, e.g. from 0 to 100 or +50 to −50 or strongly liked to strongly disliked.

Figure 5:
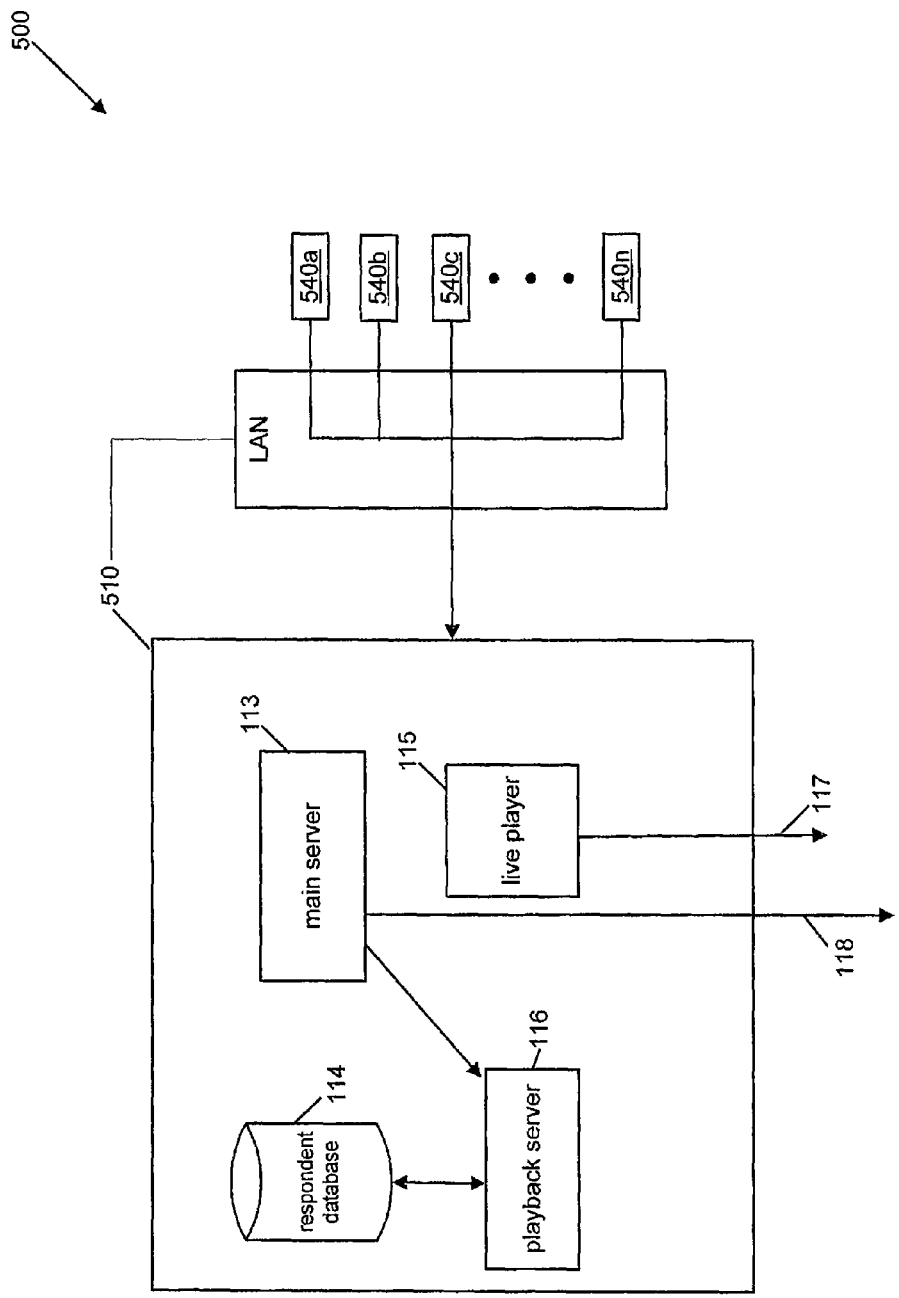
FIG. 5 illustrates an alternative outward generation system.

FIG. 5 shows an alternative output generation system that may be used, for example, in an application where users are seated in an audience to watch a debate. In this example, the output generation system 400 comprises a number of client server side components 510 connected over a local area network 520 to a plurality of identical user devices 540. The user devices may include, for example, a dial or a slider operable by the respondents to respond the time-varying stimulus.

Figure 12:
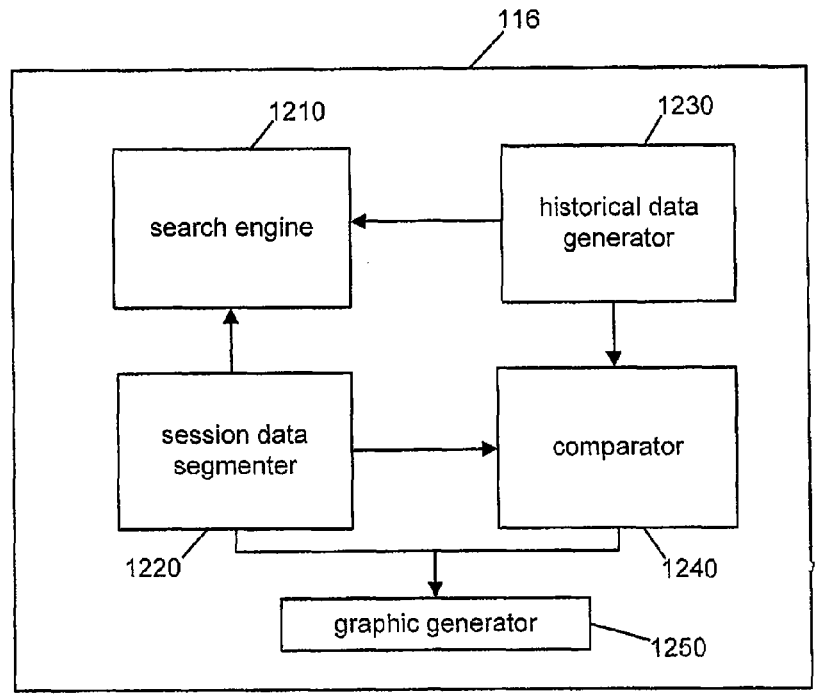
FIG. 12 is a functional block diagram of a playback server.

Referring again to FIG. 1, it is shown that the server side components 110 include a playback server 116. The playback server 116 can be used to review the results of a session at a later time and to play these back to interested parties. Accordingly, while it is indicated above, the live portion of the live display of the collective response of the group of respondents may exclude certain data received outside of a timing tolerance whereas all data that is received can be saved for later review such that the playback server has richer data. The playback server is also arranged to query the respondent database in order to identify other characteristics of respondents for alternative segmentations than those which are specified as part of a job. Accordingly, the playback server includes a search engine 210 as shown in FIG. 12 for enabling the playback server to locate respondents with specific characteristics based on respondent database. For example, it may be decided that other characteristics of respondents would be of interest than those selected for the job. The search engine allows further searching of the respondent database to locate, where possible, respondents having the desired characteristics. In this respect, as shown in FIG. 12, the search engine 1210 will in this embodiment operate under control of the session data segmenter 1220 which will then generate graphics for graphic generator 1250 for output.

A further aspect of the playback server 116 is the ability to generate historical data with historical generator 1230. For example, when assessing the effectiveness of a beer advertisement it may be desired to determine how people have responded in the past to beer advertisements. Accordingly, historical data generator uses search engine 1210 to poll previous session data 119 for data flagged as being related to beer advertisements to establish the normal response to a beer advertisement. This can then be displayed in conjunction with the segmented data for the present session or fed to a comparator function 1240 which generates data for output which is indicative of how the responses differ, for example, whether the response is more or less positive. In another example, the norm can be used as a benchmark for later advertisements. The norm can be represented as a single metric (e.g. likeability) or as a time-varying response (e.g. likeability over time). Further, norms can be presented for specific segments, such as male dog owners who use public transport and vote for a left wing party or female lizard owners who drive sports cars. Further, responses can also be segmented based on other factors, for example: time of day, relative positioning of time-varying stimulus (e.g. within an advertisement break), length of time-varying stimulus, category of stimulus, etc. That is, data is stored in session database to enable the playback server to segment advertisements to develop relevant norms. Such stimulus characteristic data may be stored when the job is specified and/or added subsequently using user terminal 120. Thus, it is possible by this method to generate comparison data for different time varying stimuli and compare the responses of respondents to prior responses to other time-varying stimuli. This also enables the generation of data indicative of the difference between a group response to a current time-varying stimulus and other time-varying stimuli.

Persons skilled in the art will appreciate that when the playback server is processing session data, the time stamps described above allow synchronisation of the responses to the test stimulus such that, for example, the output data can be displayed along a time axis corresponding to the time-varying stimulus. When the group response is to be viewed the time-varying stimulus can be displayed (where the stimulus is visual) and the time-varying group response to the time bearing stimulus can be displayed either immediately below or superimposed on the time-varying stimulus.

As responses are synchronised with the stimulus so that they may be reviewed over time, and responses to points of time within in the stimulus can be identified, the creation of significantly more granular understanding of individual and aggregate response is enabled.

Figure 8:
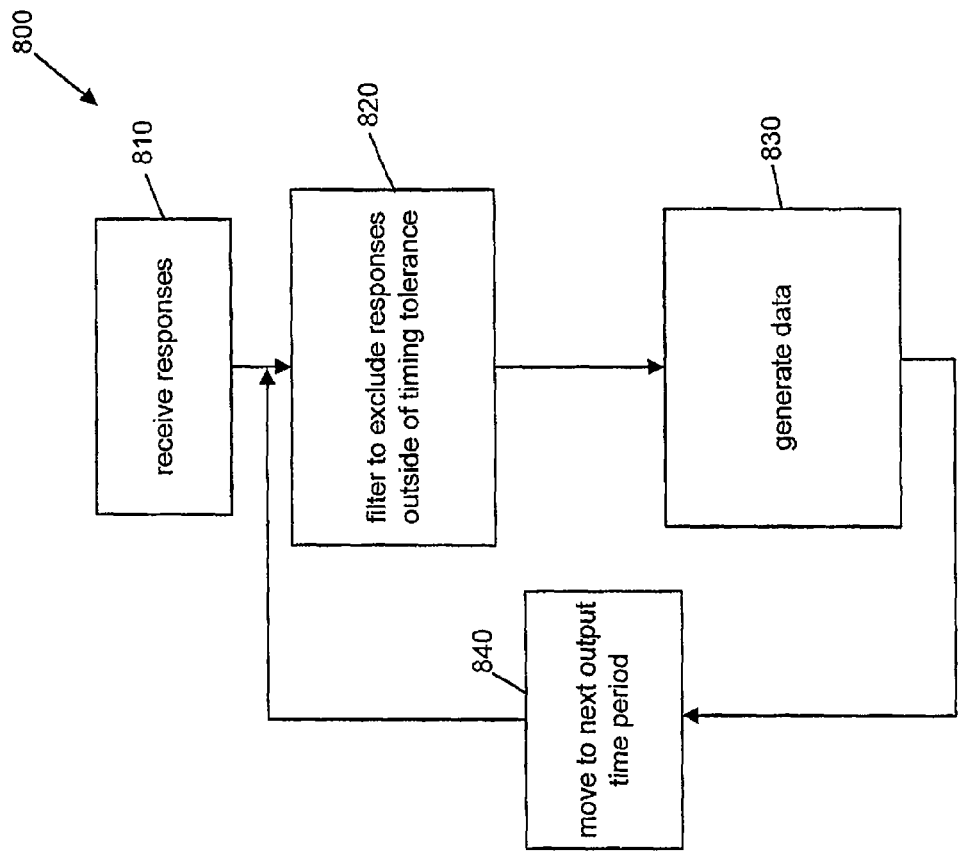
FIG. 8 is a flowchart of a method of an embodiment.

Persons skilled in the art will also appreciate that the invention is embodied as a series of methods which can be implemented electronically. FIG. 8 shows one such method which involves receiving responses 810, filtering those responses to exclude responses outside of a time intolerance 820, generating data from included responses 830 before moving to the next output time period 840 and beginning the filtering process again such that respondent devices may be included in the output data of some periods and not of others.

FIG. 9 shows a further method 900 of electronically receiving input 910 at a respondent device, monitoring 920 the input device based on an attention criterion and only communicating response data meeting the criterion 930.

FIG. 10 shows a further method 1000 which involves displaying stimulus with associated metadata 1010, receiving responses 1020, and generating output based on the response and the metadata 1030.

Figure 11:
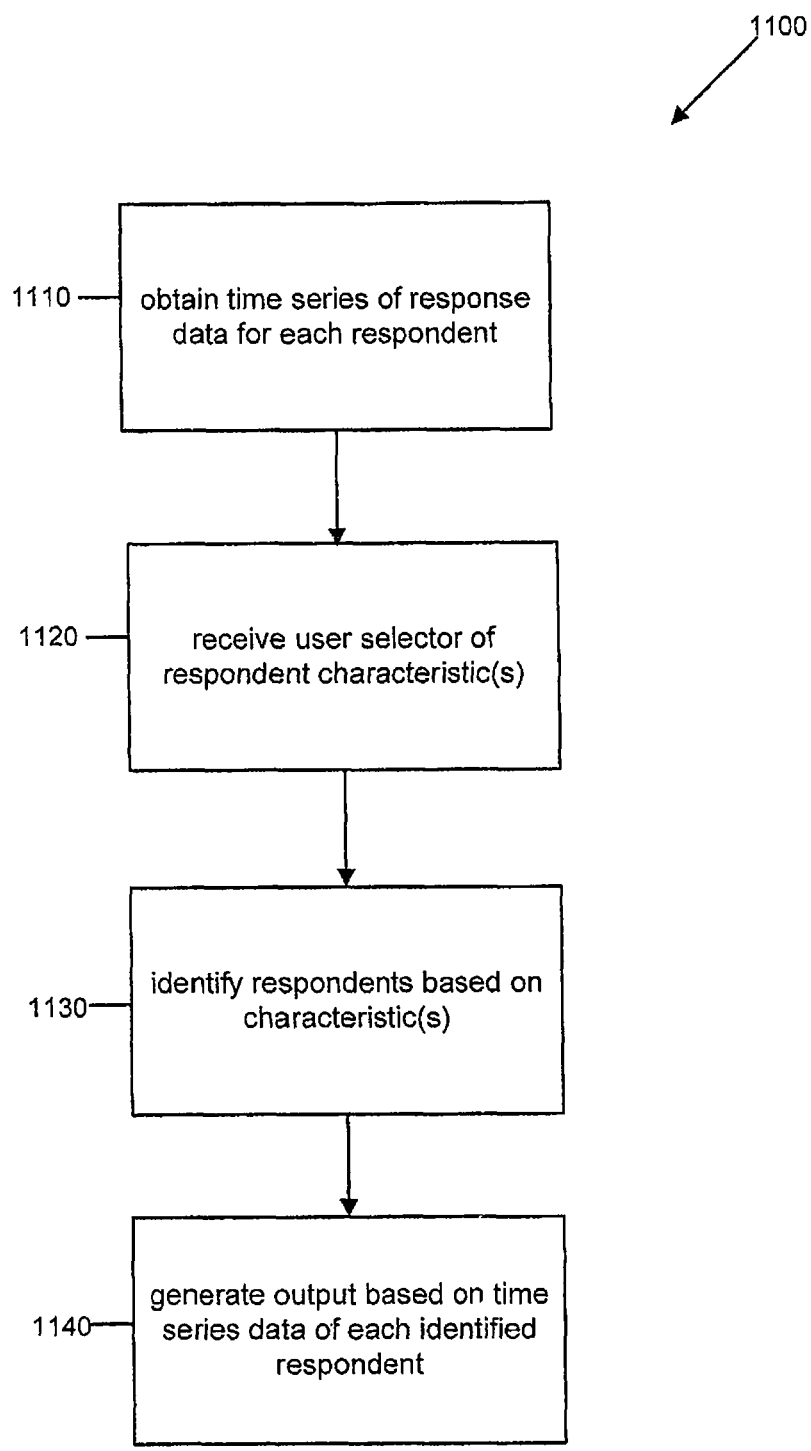
FIG. 11 is a flowchart of another method of an embodiment.

FIG. 11 shows a further method 1100 of embodiments of the invention which involves obtaining a time series of response data for each respondent 1110, receiving user selection of respondent characteristics 1120, identifying respondents based on the selected characteristics 1130 in the respondent database 114 and generating output based on time series data of each identified respondent 1140.

Figure 13:
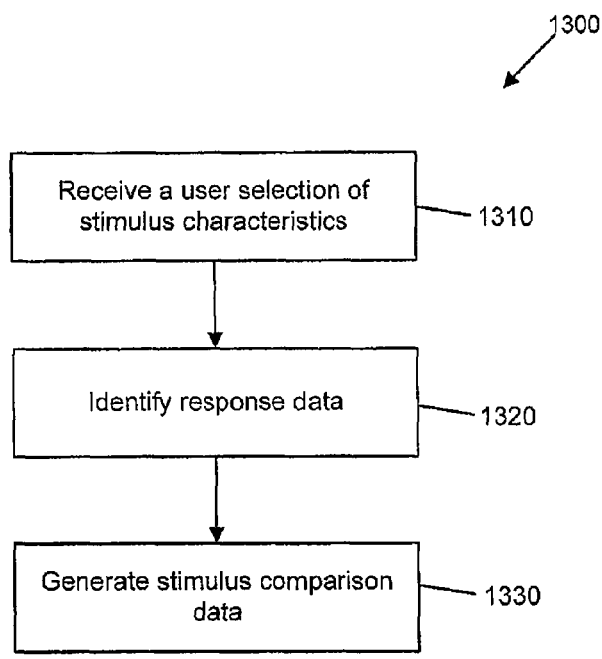
FIG. 13 is a flowchart of another method of an embodiment.

FIG. 13 shows a further method 1300 of embodiments of the invention which involves, receiving 1310 a user selection of time-varying stimulus characteristics, identifying 1320 sets of response data corresponding to the user selection and processing 1330 at least part of the sets of response data to generate stimulus comparison data.

Further aspects of the method will be apparent from the above description of the system. It will be appreciated that at least part of the method will be implemented electronically, for example, digitally by a processor executing program code. In this respect, in the above description certain steps are described as being carried out by a processor or computing equipment that incorporates one or more processors such as a server, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

Herein the term "processor" is used to refer generically to any device that can process game instructions and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method for generating group data indicative of the collective response of at least a subset of respondents who are members of an audience at one or more locations, the collective response being to a plurality of portions of a time-varying stimulus presented to the audience, the method comprising:

receiving, by an output data generation system, responses to the time-varying stimulus from respective ones of a plurality of respondent devices, each respondent device being (i) in data communication with the output data generation system and (ii) operable by a member of the audience to participate as a respondent, each response (i) including data indicative of a response of a respondent associated with the respective respondent device to the time-varying stimulus and (ii) being entered by the associated respondent using the respective respondent device;

filtering, by the output data generation system, responses corresponding to a plurality of portions of the time-varying stimulus to which the group data is intended to relate, to generate, for each one of the portions of the time-varying stimulus, a filtered response data set that excludes any delayed one or ones of the responses to the portion of the time-varying stimulus, the filtering being performed, for each portion of the time-varying stimulus, by excluding each delayed response that is (i) entered by a respondent using a respondent device within a time period corresponding to the portion of the time-varying stimulus but (ii) received from the respondent device by the output data generation system outside of a timing tolerance relative to the time period corresponding to the portion of the time-varying stimulus due to a transmission lag;

processing at least a subset of the filtered response data sets to generate the group data;

receiving an external computing system identifier of one of the respondents, and identifying one or more of the other respondents based on the external computing system identifier of the respondent;

filtering the responses to generate a respondent response data set that excludes responses not received from the identified other respondents;

generating message data based on the respondent response data set; and transmitting the message data to the external computing system using the external computing system identifier of the respondent, wherein the message data comprises one or more metrics, scores, or metrics and scores.

2. A method as claimed in claim 1, comprising outputting the group data to a display generation system arranged to process the group data to generate a display of group data.

3. A method as claimed in claim 1, comprising processing the at least a subset of the filtered response data set to generate a display of the group data.

4. A method as claimed in claim 1,
wherein a first response from at least one specific respondent device is included in at least one filtered response data set and a second response from the at least one specific respondent device is excluded from at least one filtered data set.

5. A method as claimed in claim 1, wherein the response data includes time data indicative of a time at which the response data was generated and the time data is checked when filtering the response data to determine whether communication of the response data involved a delay greater than the timing tolerance.

6. A method as claimed in claim 1, wherein identifying the other respondents comprises retrieving data enabling an identification of respondents from an external computing system using the external computing system identifier of the respondent.

7. A method as claimed in claim 6, wherein the external computing system provides a social networking website.

8. A non-transitory computer readable medium comprising computer program code which when executed implements the method of claim 1.

9. An output data generation system for generating group data indicative of the collective response of at least a subset of respondents who are members of an audience at one or more locations, the collective response being to a plurality of portions of a time-varying stimulus, the system being in data communication with a plurality of respondent devices, each respondent device being operable by a member of the audience to participate as a participant, the system comprising:
a communication interface arranged to receive responses to the time-varying stimulus from respective ones of the plurality of respondent devices, each response (i) including data indicative of a response of a respondent associated with the respective respondent device to the time-varying stimulus and (ii) being entered by the associated respondent using the respective respondent device;
a data processor including a memory, the processor arranged to:
filter response data corresponding to a plurality of portions of the time-varying stimulus to which the group data is intended to relate, to generate, for each one of the portions of the time-varying stimulus, a filtered response data set that excludes any delayed one or ones of the responses to the portion of the time-varying stimulus, the filtering being performed, for each portion of the time-varying stimulus, by excluding each delayed response that is (i) entered by a respondent using a respondent device within a time period corresponding to the portion of the time-varying stimulus but (ii) received from the respondent device by the output data generation system outside of a timing tolerance relative to the time period corresponding to the portion of the time-varying stimulus due to a transmission lag,
process at least a subset of the filtered response data sets to generate the group data;
receiving an external computing system identifier of one of the respondents, and identifying one or more of the other respondents based on the external computing system identifier of the respondent;
filtering the responses to generate a respondent response data set that excludes responses not received from the identified other respondents;
generating message data based on the respondent response data set; and
transmitting the message data to the external computing system using the external computing system identifier of the respondent,
wherein the message data comprises one or more metrics, scores, or metrics and scores.

10. A system as claimed in claim 9, wherein the communication interface is arranged to output the group data to a display generation system arranged to process the group data to generate a display of group data.

11. A system as claimed in claim 9, wherein the data processor is arranged to process the at least a subset of the filtered response data set to generate a display of the group data.

12. A system as claimed in claim 9,
wherein a first response from at least one specific respondent device is included in at least one filtered response data set and a second response from the at least one specific respondent device is excluded from at least one filtered data set.

13. A system as claimed in claim 9, wherein the response data includes time data indicative of a time at which the response data was generated and the time data is checked when filtering the response data to determine whether communication of the response data involved a delay greater than the timing tolerance.

14. A system as claimed in claim 9, wherein the data processor identifies the other respondents by controlling the communication interface to retrieve data enabling an identification of respondents from an external computing system using the external computing system identifier of the respondent.

15. A system as claimed in claim 14, wherein the external computing system provides a social networking website.

16. An electronic method for generating group data indicative of the collective response of at least a subset of respondents who are members of an audience at one or more locations, the collective response being to a plurality of portions of a time-varying stimulus presented to the audience, the method comprising:
receiving, by an output data generation system, responses to the time-varying stimulus from respective ones of a plurality of respondent devices, each respondent device being (i) in data communication with the output data generation system over at least one of a fixed line network or a wireless network and (ii) operable by a member of the audience to participate as a respondent, each response (i) including data indicative of a response of a respondent associated with the respective respondent device to the time-varying stimulus and a time stamp, and (ii) being entered by the associated respondent using the respective respondent device;
filtering, by the output data generation system, responses corresponding to a plurality of portions of the time-varying stimulus to which the group data is intended to relate, to generate, for each one of the portions of the time-varying stimulus, a filtered response data set that excludes any delayed one or ones of the responses to the portion of the time-varying stimulus, the filtering being performed, for each portion of the time-varying stimulus by checking time stamps of responses to exclude each delayed response that is (i) entered by a respondent using a respondent device within a time period corresponding to the portion of the time-varying stimulus but (ii) received from the respondent device by the output data generation system outside of a timing tolerance relative to the time period corresponding to the portion of the time-varying stimulus due to a transmission lag that is identified from the time stamp of the delayed response;

processing at least a subset of the filtered response data sets to generate the group data;

receiving an external computing system identifier of one of the respondents, and identifying one or more of the other respondents based on the external computing system identifier of the respondent;

filtering the responses to generate a respondent response data set that excludes responses not received from the identified other respondents;

generating message data based on the respondent response data set; and transmitting the message data to the external computing system using the external computing system identifier of the respondent, wherein the message data comprises one or more metrics, scores, or metrics and scores.

* * * * *

UNITED STATES PATENT AND TRADEMARK OFFICE
CERTIFICATE OF CORRECTION

PATENT NO. : 9,299,083 B2  
APPLICATION NO. : 13/524118  
DATED : March 29, 2016  
INVENTOR(S) : Hargreaves et al.

Page 1 of 1

It is certified that error appears in the above-identified patent and that said Letters Patent is hereby corrected as shown below:

On the title page item [30], insert -- July 15, 2011 (AU)........2011902840 --

Signed and Sealed this  
Twenty-eighth Day of June, 2016

Michelle K. Lee  
*Director of the United States Patent and Trademark Office*